United States Patent
Canberk et al.

(10) Patent No.: US 11,277,597 B1
(45) Date of Patent: Mar. 15, 2022

(54) MARKER-BASED GUIDED AR EXPERIENCE

(71) Applicants: Ilteris Canberk, Venice, CA (US); Shin Hwun Kang, Playa Del Rey, CA (US); Kristina Marrero, Los Angeles, CA (US)

(72) Inventors: Ilteris Canberk, Venice, CA (US); Shin Hwun Kang, Playa Del Rey, CA (US); Kristina Marrero, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/836,307

(22) Filed: Mar. 31, 2020

(51) Int. Cl.
  *G06T 15/00* (2011.01)
  *H04N 13/111* (2018.01)
  *H04N 13/366* (2018.01)
  *G06K 9/00* (2022.01)

(52) U.S. Cl.
  CPC ....... *H04N 13/111* (2018.05); *G06K 9/00671* (2013.01); *H04N 13/366* (2018.05)

(58) Field of Classification Search
  CPC ......... G06T 19/00; G06T 17/20; G06T 17/00; G06T 15/10; G06T 15/00
  USPC ....................................................... 345/419
  See application file for complete search history.

(56) References Cited

U.S. PATENT DOCUMENTS

| | | | |
|---|---|---|---|
| 9,024,842 B1 | 5/2015 | Gomez et al. | |
| 9,098,739 B2 | 8/2015 | Mutto et al. | |
| 9,235,051 B2 | 1/2016 | Salter et al. | |
| 9,541,996 B1 | 1/2017 | Baxter et al. | |
| 9,552,673 B2 | 1/2017 | Hilliges et al. | |
| 9,990,029 B2 | 6/2018 | Kochi | |

(Continued)

FOREIGN PATENT DOCUMENTS

| | | | |
|---|---|---|---|
| EP | 316615 A1 | 1/2017 | |
| EP | 3699736 A1 | 8/2020 | |

OTHER PUBLICATIONS

International Search Report and Written Opinion for International Application No. PCT/US2021/033642, dated Aug. 30, 2021 (Aug. 30, 2021)—11 pages.

(Continued)

*Primary Examiner* — Gordon G Liu
(74) *Attorney, Agent, or Firm* — Culhane Meadows PLLC; Stephen J. Weed

(57) ABSTRACT

Systems, devices, media, and methods are presented for producing an augmented reality (AR) experience for display on a smart eyewear device. The AR production system includes a marker registration utility for setting and storing markers, a localization utility for locating the eyewear device relative to a marker location and to the mapped environment, and a virtual object rendering utility to presenting one or more virtual objects having a desired size, shape, and orientation. A high-definition camera captures an input image of the environment. If the input image includes a marker, the system retrieves from memory a set of data including a first marker location expressed in terms relative to a marker coordinate system. The localization utility determines a local position of the eyewear device relative to the marker location. The virtual object rendering utility prepares one or more virtual objects for display based on the eyewear location, the head pose of the wearer, and the location of one or more physical object landmarks in the environment.

16 Claims, 13 Drawing Sheets

(56) References Cited

U.S. PATENT DOCUMENTS

| | | | |
|---|---|---|---|
| 9,996,983 B2 | 6/2018 | Mullins | |
| 10,146,414 B2 | 12/2018 | Heater | |
| 10,394,334 B2 | 8/2019 | Wang | |
| 10,509,461 B2 | 12/2019 | Mullen | |
| 10,579,207 B2 | 3/2020 | Piya et al. | |
| 10,782,779 B1 | 9/2020 | Eubank et al. | |
| 11,086,126 B1 | 8/2021 | Gollier et al. | |
| 2012/0327117 A1 | 12/2012 | Weller et al. | |
| 2013/0328927 A1* | 12/2013 | Mount | G06F 3/011 345/633 |
| 2014/0368533 A1* | 12/2014 | Salter | G06F 3/04815 345/619 |
| 2015/0097719 A1 | 4/2015 | Balachandreswaran et al. | |
| 2015/0370321 A1 | 12/2015 | Lundberg | |
| 2016/0033770 A1 | 2/2016 | Fujimaki et al. | |
| 2016/0035134 A1 | 2/2016 | Tanaka et al. | |
| 2017/0028299 A1 | 2/2017 | The et al. | |
| 2017/0053447 A1 | 2/2017 | Chen et al. | |
| 2017/0140552 A1 | 5/2017 | Woo et al. | |
| 2017/0270711 A1 | 9/2017 | Schoenberg | |
| 2017/0295446 A1 | 10/2017 | Shivappa | |
| 2017/0352184 A1 | 12/2017 | Poulos et al. | |
| 2017/0357334 A1 | 12/2017 | Balan et al. | |
| 2018/0075659 A1 | 3/2018 | Browy et al. | |
| 2019/0122085 A1 | 4/2019 | Tout et al. | |
| 2019/0220098 A1 | 7/2019 | Gupta | |
| 2019/0299059 A1 | 10/2019 | Case, Jr. et al. | |
| 2019/0318544 A1* | 10/2019 | Skidmore | H04W 4/023 |
| 2019/0325651 A1 | 10/2019 | Bradner et al. | |
| 2019/0361521 A1 | 11/2019 | Stellmach et al. | |
| 2019/0377416 A1 | 12/2019 | Alexander | |
| 2020/0312029 A1 | 10/2020 | Heinen et al. | |
| 2021/0041702 A1 | 2/2021 | Kimura et al. | |
| 2021/0096726 A1 | 4/2021 | Faulkner et al. | |
| 2021/0275914 A1 | 9/2021 | Wu et al. | |

OTHER PUBLICATIONS

Cas and Chary VR: https://www.youtube.com/watch?v=_8VqQfrHG94, viewed on Dec. 4, 2021, published online on Feb. 25, 2020 (Year: 2020).

Engadget: "Google Glass Gesture Recognition by OnTheGo Platforms at CES 2014: Engadget", Jan. 8, 2014 (Jan. 8, 2014), XP055859805, Retrieved from the Internet: URL:https://www.youtube.com/watch?v=d_jl_ZxPECg [retrieved on Nov. 11, 2021] 00:39s, 00:55s, 01:00-01:10s.

International Search Report and Written Opinion for International Application No. PCT/US2021/051109, dated Dec. 10, 2021 (Dec. 10, 2021)—17 pages.

Matthias Schwaller et al: "Pointing in the Air: Measuring the Effect of Hand Selection Strategies on Performance and Effort", Jul. 1, 2013 (Jul. 1, 2013), Human Factors in Computing and Informatics, Springer Berlin Heidelberg, Berlin, Heidelberg, pp. 732-747, XP047033542, ISBN: 978-3-642-39061-6, p. 740; figure 4.

Partial International Search Report and Written Opinion for International Application No. PCT/US2021/047637, dated Jan. 7, 2022 (Jan. 7, 2022)—10 pages.

\* cited by examiner

MARKER-BASED GUIDED AR EXPERIENCE

TECHNICAL FIELD

Examples set forth in the present disclosure relate to the field of augmented reality (AR) and wearable electronic devices such as eyewear. More particularly, but not by way of limitation, the present disclosure describes an augmented-reality experience viewable through a smart eyewear device and guided by a set of virtual markers.

BACKGROUND

Many types of computers and electronic devices available today, such as mobile devices (e.g., smartphones, tablets, and laptops), handheld devices (e.g., smart rings, special-purpose accessories), and wearable devices (e.g., smartglasses, digital eyewear, headwear, headgear, and head-mounted displays), include a variety of cameras, sensors, wireless transceivers, input systems (e.g., touch-sensitive surfaces, pointers), peripheral devices, displays, and graphical user interfaces (GUIs) through which a user can interact with displayed content.

Augmented reality (AR) combines real objects in a physical environment with virtual objects. The combined display gives the impression that the virtual objects are authentically present in the environment, especially when the virtual objects appear and behave like the real objects.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
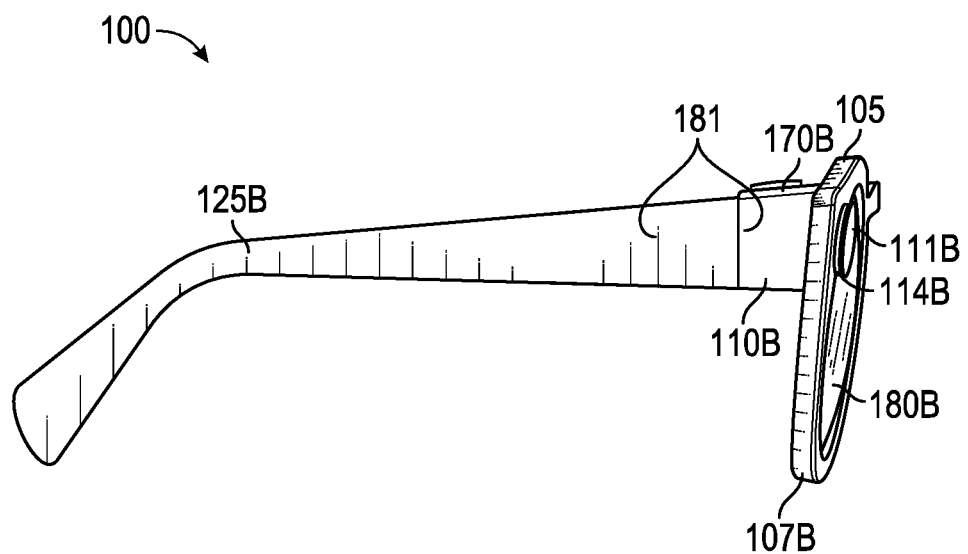
FIG. 1A is a side view (right) of an example hardware configuration of an eyewear device suitable for use in an augmented reality production system.

Various implementations and details are described with reference to an example: a system for producing an augmented reality experience on an eyewear device. The eyewear device includes a camera, a processor, a memory, and a display. The production system includes a marker registration utility for setting and storing markers, a localization utility for locating the eyewear device relative to a marker location and to the mapped environment, and a virtual object rendering utility to presenting one or more virtual objects having a desired size, shape, and orientation. The camera captures an input image of a physical environment. If the input image includes a first marker, the system retrieves from memory a first marker location associated with the first marker. Each marker location is expressed in terms relative to a marker coordinate system. The localization utility determines a first local position of the eyewear device relative to the first marker location. The virtual object rendering utility renders the first virtual object for presentation on the display.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The orientations of the eyewear device, the handheld device, associated components and any other complete devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear 100 may include a touchpad on the left side.

The surface of the touchpad 181 is configured to detect finger touches, taps, and gestures (e.g., moving touches) for use with a GUI displayed by the eyewear, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
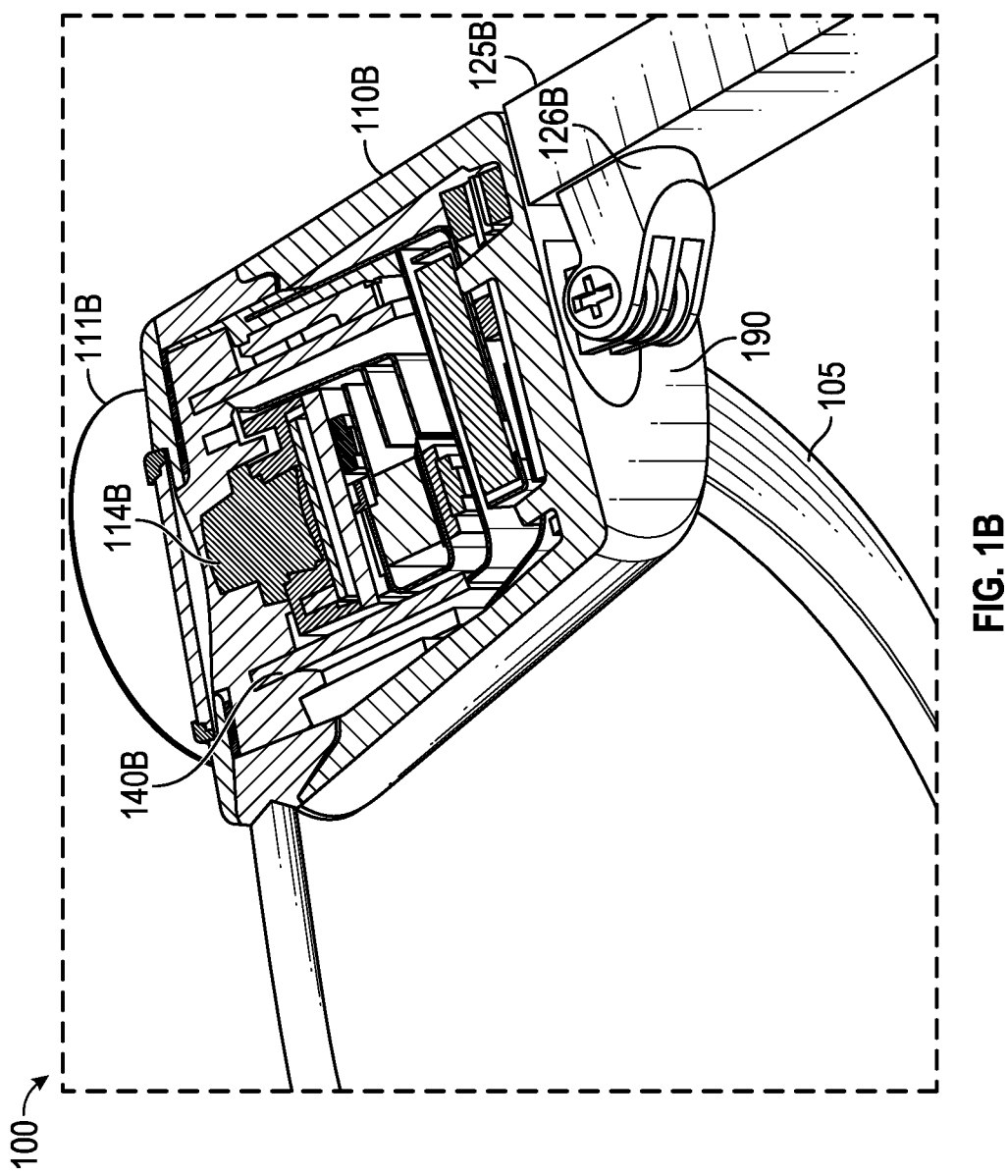
FIG. 1B is a top, partly sectional view of a right corner of the eyewear device of FIG. 1A depicting a right visible-light camera, and a circuit board.
Figure 1C:
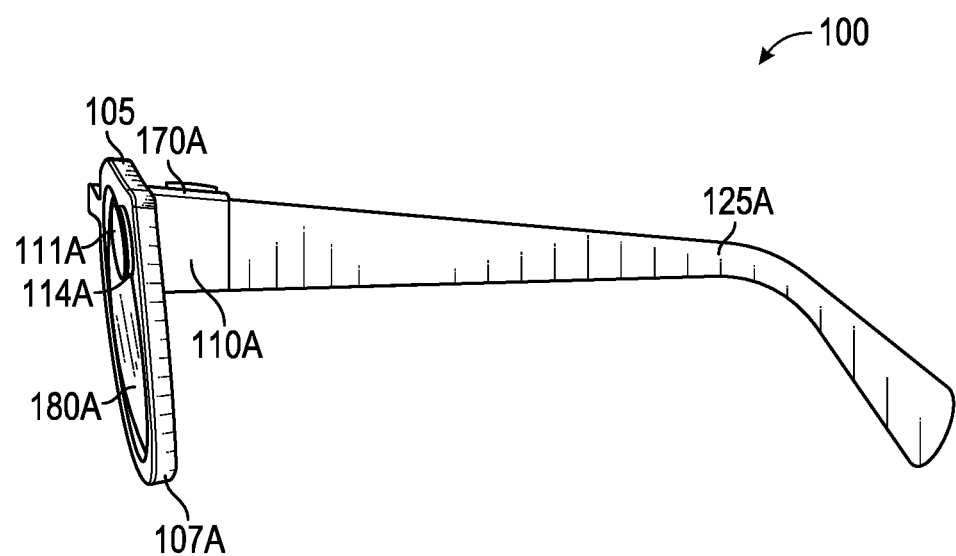
FIG. 1C is a side view (left) of an example hardware configuration of the eyewear device of FIG. 1A, which shows a left visible-light camera.
Figure 1D:
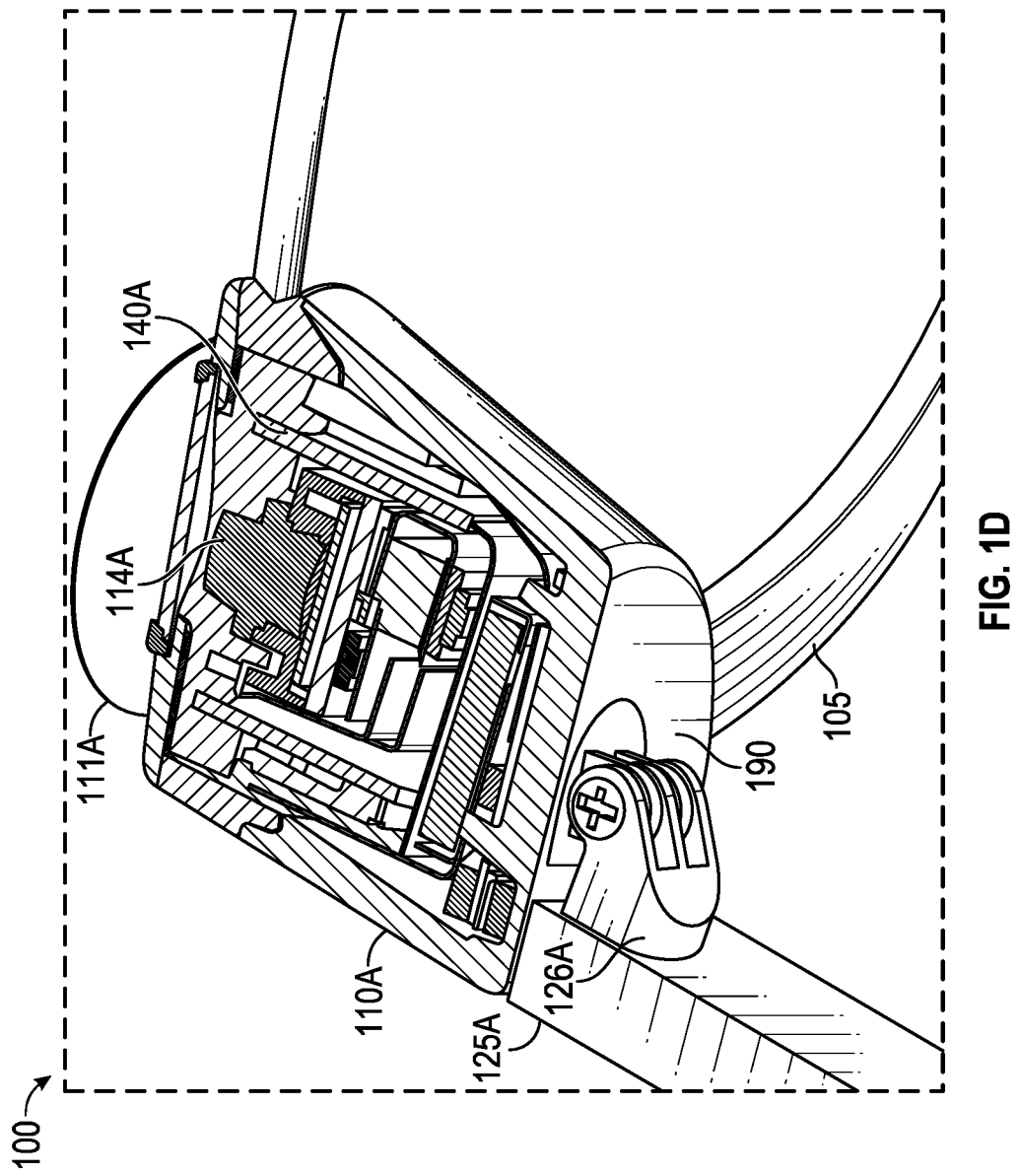
FIG. 1D is a top, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
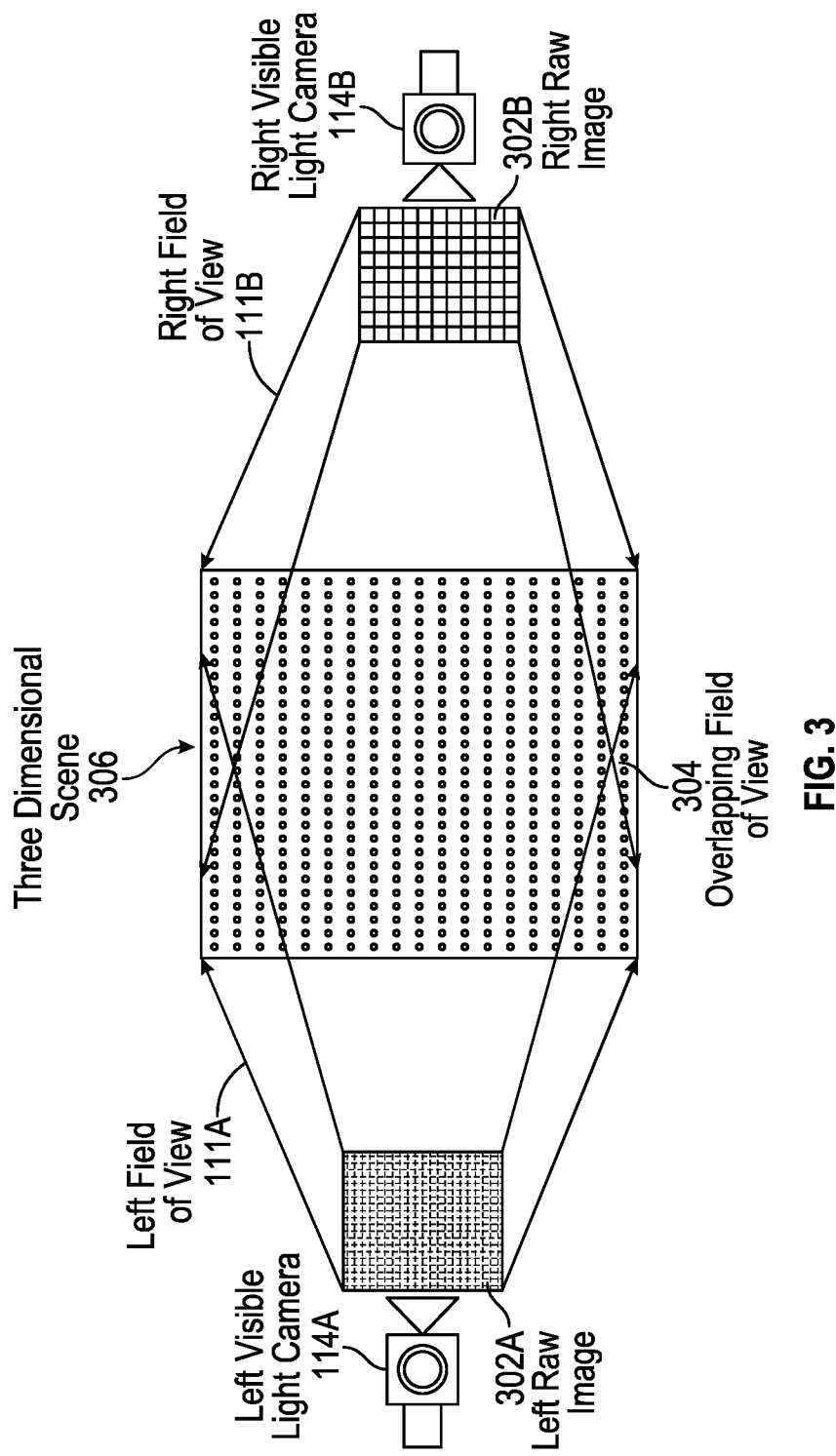
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible-light cameras 114A, 114B have a field of view with an angle of view between 15° to 30°, for example 24°, and have a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412 or another processor, which controls operation of the visible-light cameras 114A, 114B to act as a stereo camera simulating human binocular vision, may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the augmented reality production system 400 (FIG. 4) includes the eyewear device 100, which includes a frame 105 and a left temple 110A extending from a left lateral side 170A of the frame 105 and a right temple 125B extending from a right lateral side 170B of the frame 105. The eyewear device 100 may further include at least two visible-light cameras 114A, 114B which may have overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

FIG. 1B is a top cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a top cross-sectional view of a left corner 110A of the eyewear device of FIG. 1C depicting the left visible-light camera 114A of the three-dimensional camera, and a circuit board. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
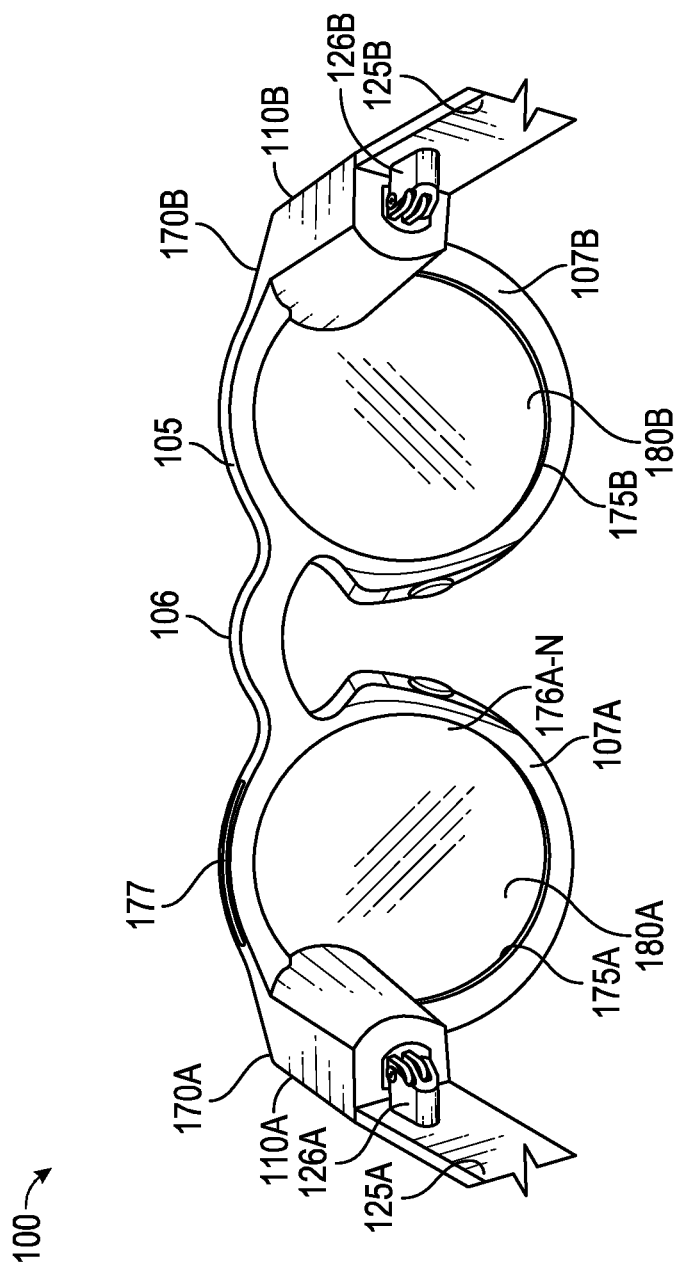
FIGS. 2A and 2B are rear views of example hardware configurations of an eyewear device utilized in the augmented reality production system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
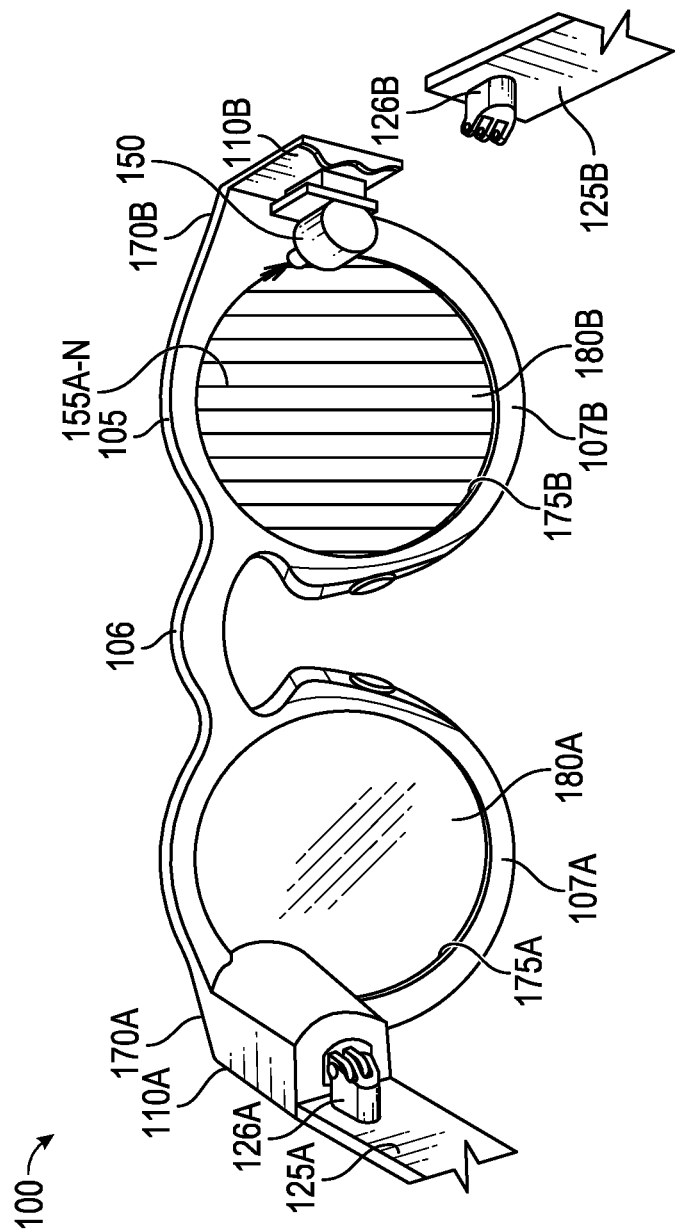

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double prime, A through N, not shown) which are configured to interact with light from the right projector 150B. In this example, the eyewear device 100 includes a left display and a right display.

Figure 4:
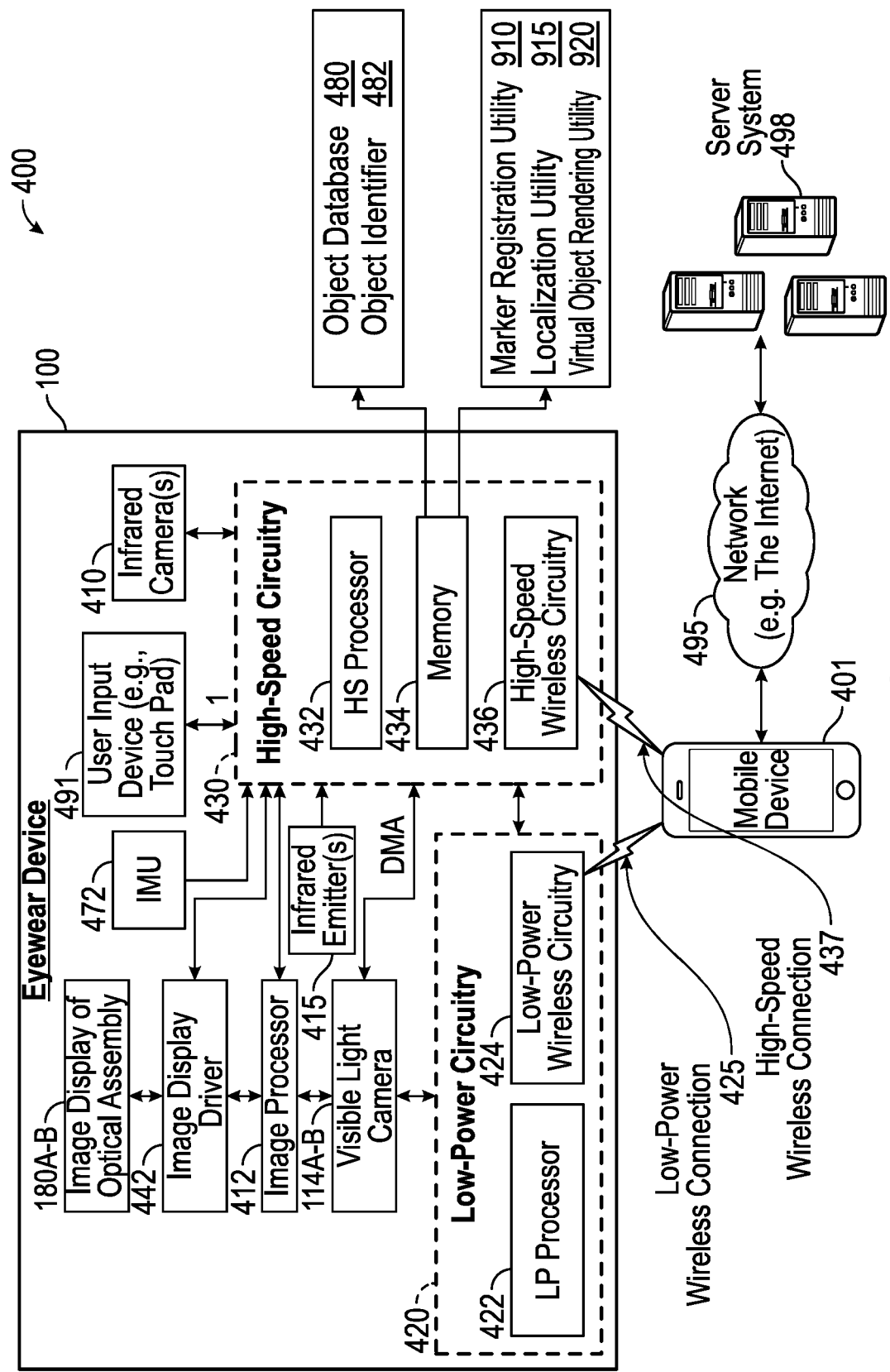
FIG. 4 is a functional block diagram of an example augmented reality production system including a wearable device (e.g., an eyewear device) and a server system connected via various networks.

FIG. 4 is a functional block diagram of an example augmented reality production system 400 including a wearable device (e.g., an eyewear device 100), a mobile device 401, and a server system 498 connected via various networks 495 such as the Internet. The augmented reality production system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
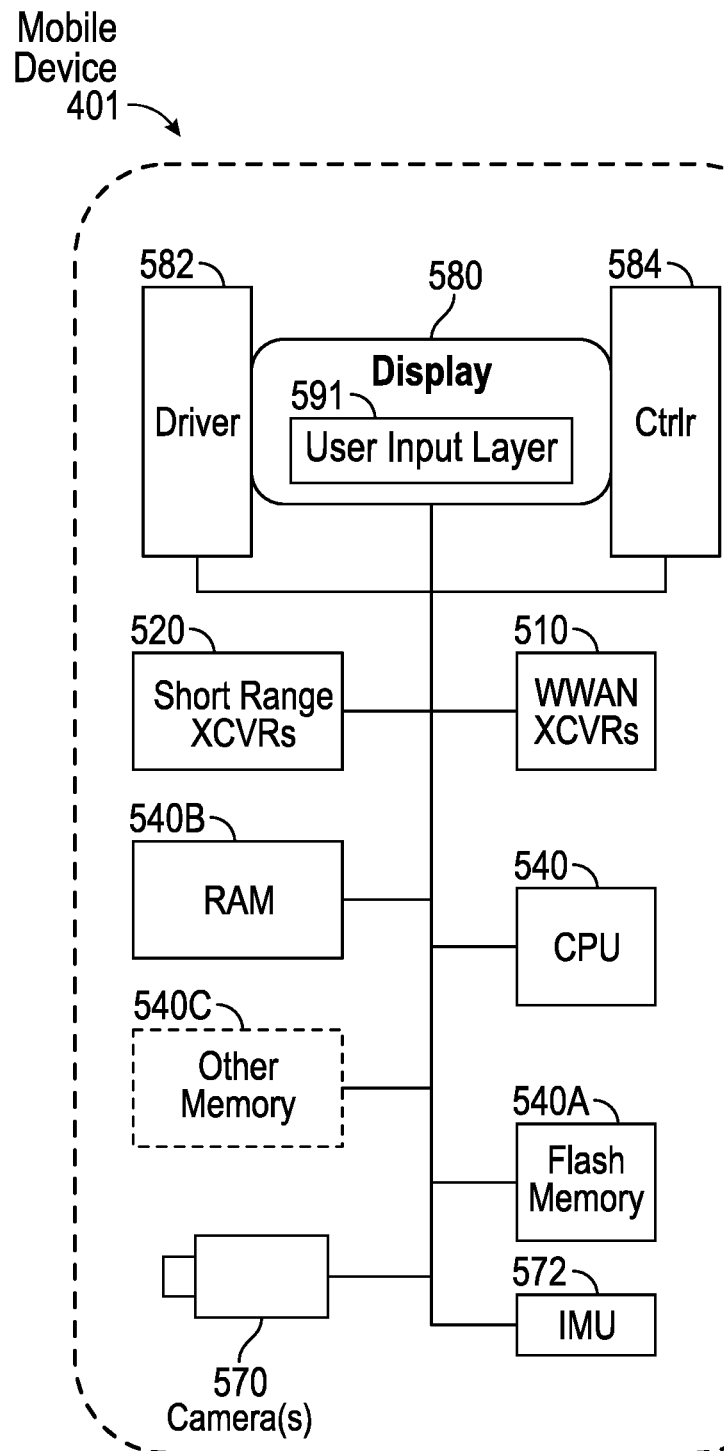
FIG. 5 is a diagrammatic representation of an example hardware configuration for a mobile device of the augmented reality production system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 891, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS receiver, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The augmented reality production system 400, as shown in FIG. 4, includes a computing device, such as mobile device 401, coupled to an eyewear device 100 over a network. The augmented reality production system 400 includes a memory for storing instructions and a processor for executing the instructions. Execution of the instructions of the augmented reality production system 400 by the processor 432 configures the eyewear device 100 to cooperate with the mobile device 401. The augmented reality production system 400 may utilize the memory 434 of the eyewear device 100 or the memory elements 540A, 540B, 540C of the mobile device 401 (FIG. 5). Also, the augmented reality production system 400 may utilize the processor elements 432, 422 of the eyewear device 100 or the central processing unit (CPU) 530 of the mobile device 401 (FIG. 5). In addition, the augmented reality production system 400 may further utilize the memory and processor elements of the server system 498. In this aspect, the memory and processing functions of the augmented reality production system 400 can be shared or distributed across the eyewear device 100, the mobile device 401, and the server system 498.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 4, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example mobile device 401 with a user interface that includes a touchscreen input layer 891 for receiving input (by touch, multi-touch, or gesture, and the like, by hand, stylus or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection.

Sensor data includes images received from one or both of the cameras 114A, 114B, distance(s) received from a laser range finder, position information received from a GPS unit, or a combination of two or more of such sensor data, or from other sensors providing data useful in determining positional information.

Figure 6:
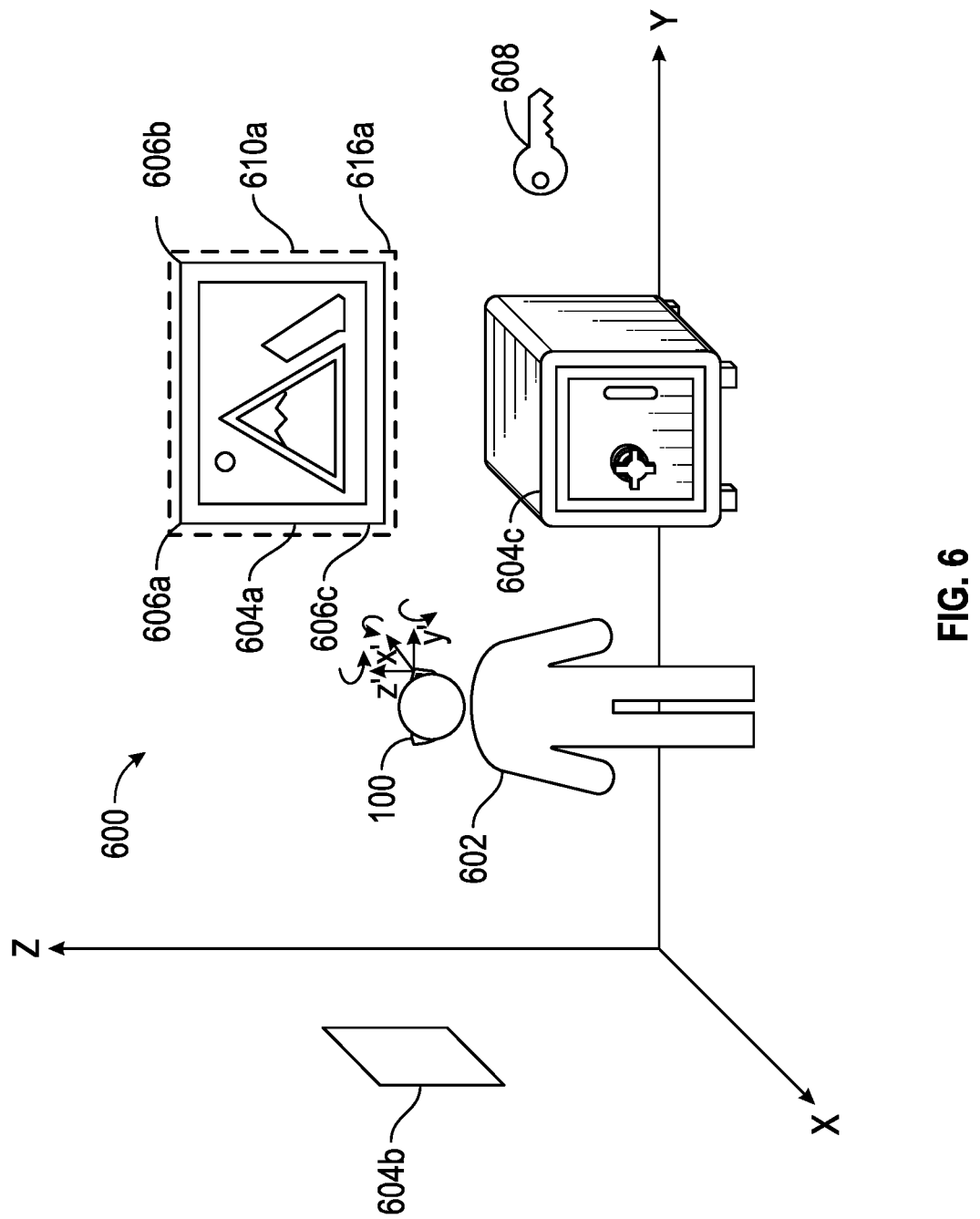
FIG. 6 is a schematic illustration of a user in an example environment for use in describing simultaneous localization and mapping.

FIG. 6 depicts an example environment 600 along with elements that are useful for natural feature tracking (NFT; e.g., a tracking application using a SLAM algorithm). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position a virtual object 408 (such as the key shown in FIG. 6) within the environment 600 for augmented reality viewing via image displays 180.

Figure 7:
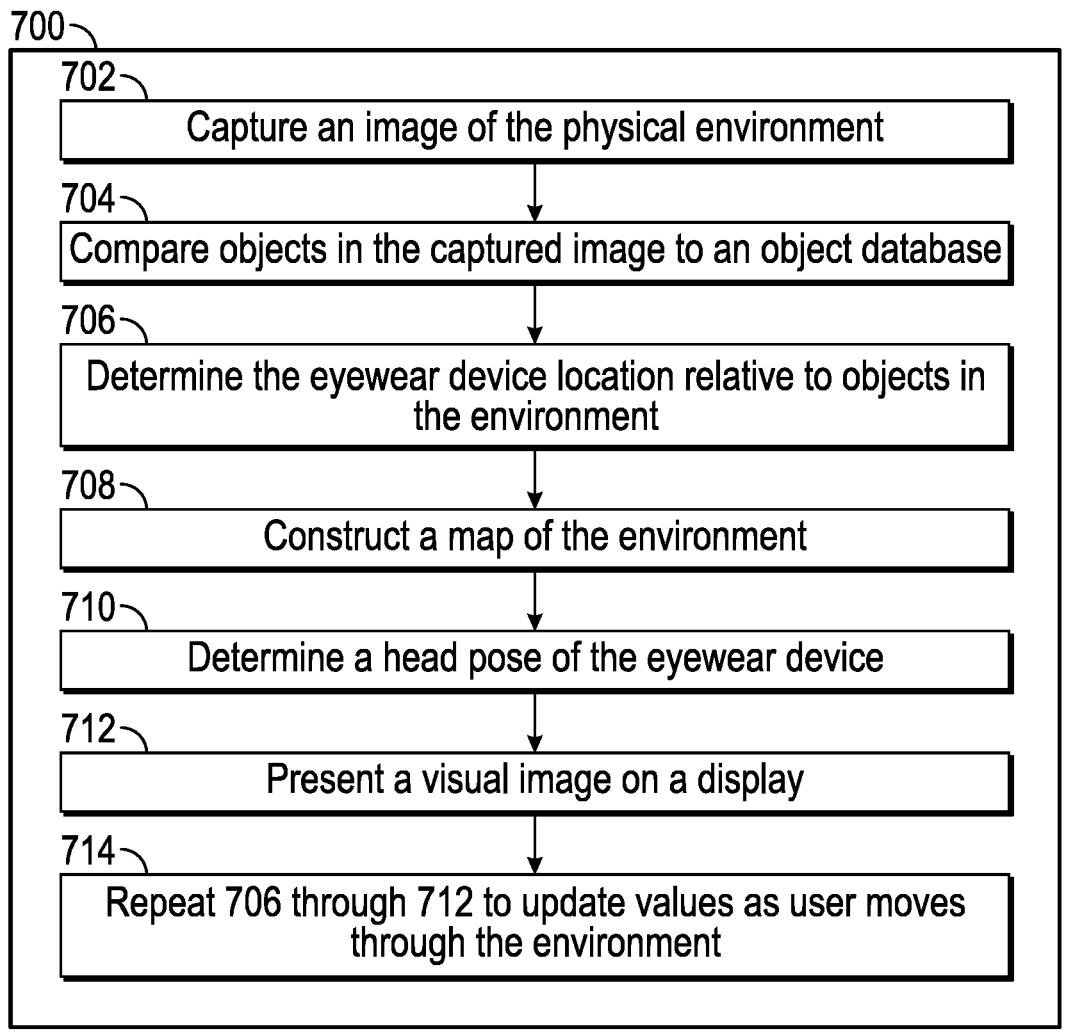
FIG. 7 is a flow chart listing steps in an example method of displaying virtual objects in a physical environment.

FIG. 7 is a flow chart 700 depicting a method for implementing augmented reality applications described herein on a wearable device (e.g., an eyewear device). Although the steps are described with reference to the eyewear device 100, as described herein, other implementations of the steps described, for other types of devices, will be understood by one of skill in the art from the description herein. Additionally, it is contemplated that one or more of the steps shown in FIG. 7 and described herein may be omitted, performed simultaneously or in a series, performed in an order other than illustrated and described, or performed in conjunction with additional steps.

At block 702, the eyewear device 100 captures one or more input images of a physical environment 600 near the eyewear device 100. The processor 432 may continuously receive input images from the visible light camera(s) 114 and store those images in memory 434 for processing. Additionally, the eyewear device 100 may capture information from other sensors (e.g., location information from a GPS sensor or distance information from a laser distance sensor).

At block 704, the eyewear device 100 compares objects in the captured images to objects stored in a library of images to identify a match. In some implementations, the processor 432 stores the captured images in memory 434. A library of images of known objects is stored in an object database 480. The processor 432 compares the captured images to the library of images, using an object identifier 482, to determine if any objects in the captured images match any of the objects stored in the object database 480. The object identifier 482, in some implementations, includes a conventional object recognition algorithm or a neural network trained to identify objects.

In one example, the processor 432 is programmed to identify a predefined particular object (e.g., a particular picture 604a hanging in a known location on a wall, a window 604b in another wall, or an object such as a safe 604c positioned on the floor). Other sensor data, such as GPS data, may be used to narrow down the number of known objects for use in the comparison (only images associated with a room identified through GPS coordinates). In another example, the processor 432 is programmed to identify predefined general objects (such as one or more trees within a park).

At block 706, the eyewear device 100 determines its position with respect to the object(s). The processor 432 may determine its position with respect to the objects by comparing and processing distances between two or more points in the captured images (e.g., between two or more location points on one objects 604 or between a location point 606 on each of two objects 604) to known distances be between corresponding points in the identified objects. Distances between the points of the captured images greater than the points of the identified objects indicates the eyewear device 100 is closer to the identified object than the imager that captured the image including the identified object. On the other hand, distances between the points of the captured images less than the points of the identified objects indicates the eyewear device 100 is further from the identified object than the imager that captured the image including the identified object. By processing the relative distances, the processor 432 is able to determine the position within respect to the objects(s). Alternatively, or additionally, other sensor information, such as laser distance sensor information, may be used to determine position with respect to the object(s).

At block 708, the eyewear device 100 constructs a map of an environment 600 surrounding the eyewear device 100 and determines its location within the environment. In one example, where the identified object (block 704) has a predefined coordinate system (x, y, z), the processor 432 of the eyewear device 100 constructs the map using that predefined coordinate system and determines its position within that coordinate system based on the determined positions (block 706) with respect to the identified objects. In another example, the eyewear device constructs a map using images of permanent or semi-permanent objects 604 within an environment (e.g., a tree or a park bench within a park). In accordance with this example, the eyewear device 100 may define the coordinate system (x', y', z') used for the environment.

At block 710, the eyewear device 100 determines a head pose (roll, pitch, and yaw) of the eyewear device 100 within the environment. The processor 432 determines head pose by using two or more location points (e.g., three location points 606a, 606b, and 606c) on one or more objects 604 or by using one or more location points 606 on two or more objects 604. Using conventional image processing algorithms, the processor 432 determines roll, pitch, and yaw by comparing the angle and length of a lines extending between the location points for the for the captured images and the known images.

At block 712, the eyewear device 100 presents visual images to the user. The processor 432 presents images to the user on the image displays 180 using the image processor 412 and the image display driver 442. The processor develops and presents the visual images via the image displays responsive to the location of the eyewear device 100 within the environment 600.

At block 714, the steps described above with reference to blocks 706-712 are repeated to update the position of the eyewear device 100 and what is viewed by the user 602 as the user moves through the environment 600.

Referring again to FIG. 6, the method of implementing augmented reality applications described herein, in this example, includes a virtual marker 610a that associated with a physical object 604a in the environment 600. In an AR system, markers are registered at locations in the environment to assist devices with the task of tracking and updating the location of users and devices in a mapped environment. Markers are sometimes registered to a high-contrast physical object, such as the relatively dark object 604a mounted on a lighter-colored wall, to assist cameras and other sensors with the task of detecting the marker.

Markers can be encoded with or otherwise linked to information. A marker might include a code, such as a bar code or a QR code; either visible to the user or hidden. The marker 610a, in this example, is associated with a set of data stored in the memory 434 of the eyewear device 100. The set of data includes information about the marker 610a, a marker location, and one or more virtual objects. The marker location includes three-dimensional coordinates for one or more marker landmarks 616a, such as the corner of the generally rectangular marker 610a shown in FIG. 6. The marker location includes the coordinates of one or more marker landmarks 616a and may be expressed relative to real-world geographic coordinates, a system of marker coordinates, or any other known coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered may be classified as a virtual object in this context. The key 608 shown in FIG. 6, for example, is a virtual object displayed as a still image, either 2D or 3D.

The marker 610a, in this example, is registered in memory as being located near, and associated with physical object 604a (e.g., the framed work of art shown in FIG. 6). Markers may be registered using a marker registration utility 910 as described herein. Registration in this example includes identifying and storing the coordinates of one or more marker landmarks 616a that define the size and shape of the marker 610a. One or more of the marker landmarks may or may not coincide closely with one or more location points 606a, 606b, 606c associated with a real physical object 604a.

The marker 610a, in this example, is a fiducial marker because its known size, shape, and orientation (i.e., the values stored as part of the marker location) can be used as a measurement guide and a point of reference. For example, a virtual object rendering utility 920 as described herein uses the marker location to help determine the appropriate size, shape, and orientation when rendering and the one or more virtual objects. In this aspect, the marker 610a serves as an anchor to the real-world physical environment.

Figure 9:
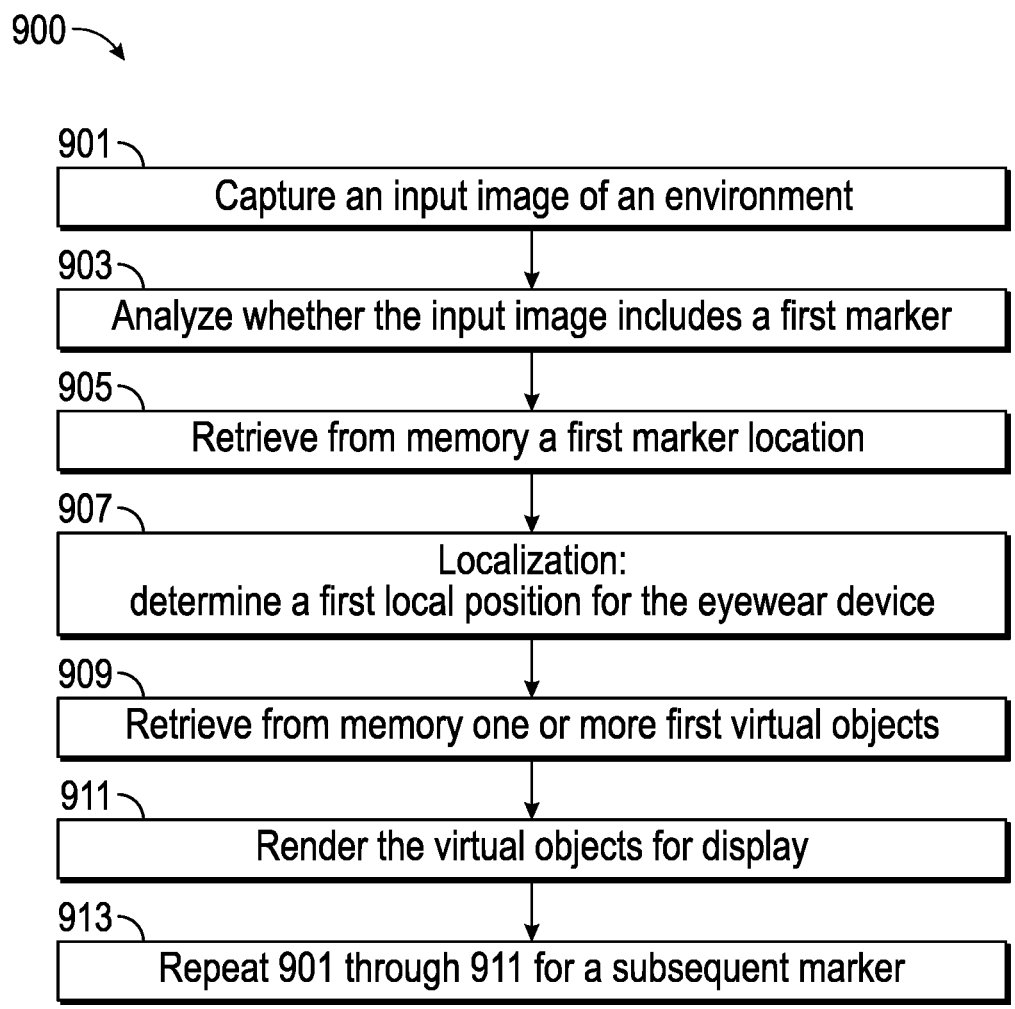
FIG. 9 is a flow chart listing steps in an example method of producing an augmented reality experience.

FIG. 9 is a flow chart 900 listing steps in an example method of producing an augmented reality experience. The method, at step 901, includes capturing an input image of a physical environment 600 with a camera 114 that is coupled to or part of an eyewear device 100. The camera 114, in some implementations, includes one or more high-resolution digital cameras equipped with a CMOS image sensor capable of capturing high-definition still images and high-definition video. In this aspect, the camera 114 serves as a high-definition scanner by capturing a detailed input image of the environment. The camera 114, in some implementations, includes a pair of high-resolution digital cameras coupled to the eyewear 100 and spaced apart to acquire a left-camera raw image and a right-camera raw image. When combined, the raw images form an input image that includes a matrix of three-dimensional pixel locations.

The method, in this example, includes analyzing the input image to determine if it includes a first marker. The analysis, at step 903, includes comparing the objects found in the input image to the objects stored in an object database 480. The objects stored in the object database 480, in this example, include one or more virtual markers 610a as described herein. The information stored in the object database 480, in this example, includes a set of data about the marker 610a including, in some implementations, the marker location and one or more virtual objects. Step 905 includes retrieving the set of data, including the first marker location, from memory. The set of data about each marker 610a, in some implementations, is saved in memory 434 during the task of registering markers in a physical space using a marker registration utility 910 as described herein.

At step 907 the eyewear device 100 determines its first local position relative to the first maker location, in a process known as localization. According to one example, a first marker is detected in the input image and the first marker location is retrieved from memory. The eyewear device 100 is preparing to render a first virtual object and present it to the user on a display (e.g., one of the lenses of the eyewear device 100). Before the first virtual object can be rendered and presented in an accurate and realistic manner, in this example, one or more of several steps may be completed. In localization, at step 907, the first local position of the eyewear device 100 relative to the first marker location is determined, as described herein. In addition, the method may include constructing a map of the environment 600 (block 708 of FIG. 7) and determining a head pose (block 710), as described herein, both of which help to further orient the position of the eyewear device 100 relative to the mapped environment. The eyewear device at step 909 retrieves from memory one or more first virtual objects, associated with the first marker.

Using the orientation results obtained during localization (step 907) and using a virtual object rendering utility 920, the eyewear device 100, at step 911, executes the step of rendering the first virtual object for presentation on the display in a size, shape, and orientation that is relative to both the first marker location and relative to the user's head pose (and, accordingly, the field of view) of the user.

In some implementations, the display is projected onto one or both lenses of the eyewear device 100, facilitating a view of both the virtual object and the physical environment. For example, the right lens (right optical assembly 180B) includes a right display matrix 177B configured to interact with light from a right projector 150B positioned to project images onto the interior surface of the lens 180B. In this aspect, the first virtual object is presented as an overlay relative to the physical environment, such that the first virtual object is persistently viewable.

At step 913, the steps described above with reference to a first marker (steps 901 through 911) are repeated for a subsequent marker. The method captures a subsequent image for analysis, performs the localization of the eyewear device 100 (again; this time with respect to the subsequent marker location), and renders one or more subsequent virtual objects for presentation on the display. In this aspect, the method updates the current position of the eyewear device 100 and updates the content presented on the display for viewing by the user 602 as the user moves through the environment 600.

Figure 8:
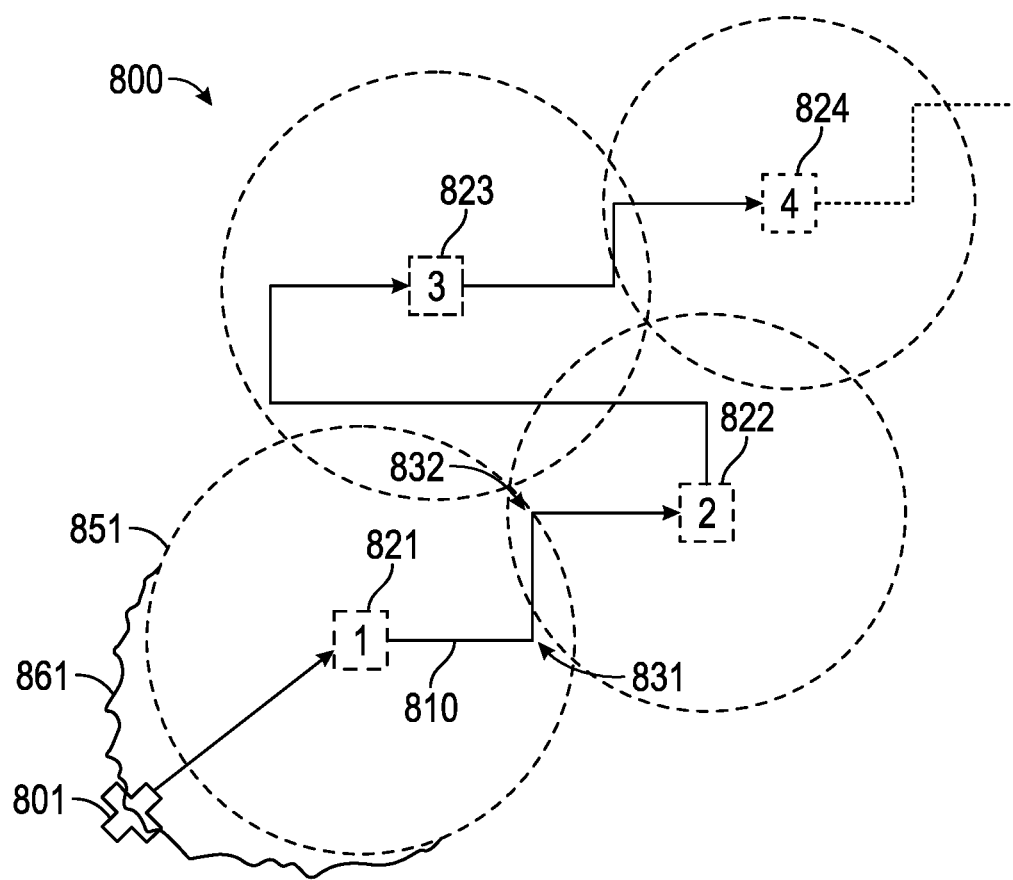
FIG. 8 is a schematic illustration of a series of markers placed along a path in a select environment.

FIG. 8 is a schematic diagram of a series of markers placed along a path 810 in a select environment 800, such as a museum, retail space, residence, hiking trail, outdoor attraction, or park. In some implementations, an advance team selects the environment 800, designs a suitable immersive experience including a series of markers along a path 810, enters the environment 800 and selects a series of physical objects with which each marker will be associated, and uses a marker registration utility 910 (e.g., when the team is near each selected physical object) to identify, register, and store in a memory the marker coordinates associated with each marker location. The marker registration utility 910 is also used to establish a three-dimensional marker coordinate system for use with the markers in this select environment 800. The origin (0, 0, 0) may be set and associated with a first marker 821, near a starting point 801, or at any other location in the environment 800. Each registered marker location includes coordinates relative to the marker coordinate system, without necessarily relying on references to a geographic coordinate system or other external reference, which is particularly useful in environments with limited access to GPS location signals and the like. The registered markers, in some examples, are stored in the memory 434 of each of a plurality of eyewear devices 100 which are provided to users as they enter the environment 800.

As illustrated by example in FIG. 8, the path 810 includes a first marker 821, a subsequent marker 822, and additional markers 823, 824 which may be arranged in a series or a preferred order. The path 810 also includes intermediate locations 831, 832 or waypoints located between markers.

The presentation of virtual objects may include one or more directional indicators (e.g., pointers, arrows, dotted lines, video characters, audible instructions, tactile cues) to guide the user toward the next intermediate location or toward the next marker. In this aspect, the virtual object includes not only an item or object displayed near the marker, but also other items or objects for display when the user is between marker locations along the path 810. Each intermediate location 831, 832 has coordinates relative to the marker coordinate system.

Localization of the eyewear device 100, in some implementations, may be executed at each marker. For example, the step of determining a first local position of the eyewear device 100 relative to the first marker location may be executed when the user interacts with the first marker 821. A subsequent local position is determined at a subsequent marker, and so on. In systems that rely on an initial marker location (or the origin point for the marker coordinates), the local position of the eyewear device 100 later along the path 810, as the user moves away, may become less and less accurate due to a phenomenon sometimes called drift. Even in systems that use a SLAM algorithm at the initial marker, drift often impacts the accuracy of eyewear position at later markers. The method described herein, in some implementations, includes the option of performing a new localization, or a re-localization, of the eyewear device 100 at each marker. For example, a command to perform re-localization may be included in the set of data associated with each marker, or as part of the virtual object associated with the marker. Re-localization may be executed using natural feature tracking (NFT) or another suitable SLAM algorithm, or by reference to one or more known object landmarks in a high-definition input image captured by a camera 114 on the eyewear device 100. Re-localization may be executed multiple times, or by different techniques; comparing the results to evaluate accuracy or determine if additional re-localization is needed.

In addition to a set of marker coordinates, each marker location includes one or more parameters to define a spatial perimeter around the marker. The first perimeter 851 associated with first marker 821, for example, defines a 2D or 3D space. Although the first perimeter 851 is illustrated as a circle, the marker perimeters may take any shape, may or may not be centered on a marker, and may or may not be symmetrical relative to a marker. Accordingly, the first perimeter 851 may be defined by a set of perimeter coordinates along with additional elements including but not limited to distances, vectors, angles, radii, planes, and irregular shapes.

The first marker location 821 may also include a first proximity 861 associated with the first perimeter 851, extending the boundary, in effect, to encompass additional space beyond the first perimeter 851 as defined. For example, the method of implementing an augmented reality experience, in this implementation, includes determining whether the first local position of an eyewear device 100 is within a first proximity 861 of the first perimeter 851 associated with the first marker 821. A user may be located near a starting point 801, for example, which is not within the first perimeter 851 but may lie within a first proximity 861 of the first perimeter 851. In this aspect, the system recognizes users and eyewear locations that are near but not necessarily within a perimeter surrounding a marker. The user experience may be configured to start automatically (i.e., to render and display one or more virtual objects) as soon as a user is located within a proximity close to the perimeter associated with any marker along the path 810.

When a user approaches a marker, in some implementations, the user experience is configured to present a graphical user interface (GUI) to the user on the display. The GUI may include any of a variety of options, such as start or stop; pause or continue; accept or decline (e.g., the entire experience, this marker alone, this group of markers); select a marker from a set of available nearby markers (e.g., when the user is within a proximity of multiple markers; displaying the set as a list or in carousel fashion); or select an object from a set of available virtual objects (e.g., in a game-like experience that varies according to the virtual object selected by the user at certain locations).

In a related aspect, the perimeter or proximity may be used to detect when a user has left the area near a marker. For example, in response to determining that the first local position of an eyewear device 100 is located outside the first perimeter 851, the first virtual object associated with the first marker 821 includes one or more instructions for guiding the user back toward the first marker 821.

Each marker or marker location may also include a programmable duration. When a user interacts with a subsequent marker 822, for example, the step of rendering its associated subsequent virtual object includes starting a timer. If the user lingers too long near the subsequent marker 822 and the timer exceeds the programmable duration, additional action is initiated. For example, the step of rendering and displaying the subsequent virtual object may stop, one or more directional indicators may appear, or one or more instructions may be displayed to guide the user toward the next marker.

The augmented reality production system 400, in some implementations, includes an eyewear device 100 having a camera 114, a processor 432, a memory 434, and a display 180A, 180B. Programming stored in memory includes a marker registration utility 910 for setting and storing markers, a localization utility 915 for locating the eyewear device 100 relative to a marker location and to the mapped environment, and a virtual object rendering utility 920 to presenting one or more virtual objects having a desired size, shape, and orientation. Execution of the programming configures the eyewear device to perform the steps described herein, such as those in the flow chart 700 and those described with reference to FIG. 6 and FIG. 8.

The marker registration utility 910, in some implementations, registers each of a plurality of marker locations relative to one or more landmarks in a physical environment, including a first marker location. The marker registration utility 910 stores in memory a first set of data associated with the first marker, including the first marker location and one or more first virtual objects. The marker registration utility 910 also registers one or more subsequent marker locations relative to the marker coordinate system and stores in memory a subsequent set of data associated with the subsequent marker.

The localization utility 915 locates the position of the eyewear device 100 relative to one or more nearby marker locations, and relative to the mapped environment. The localization utility 915 may be selectively executed at a first marker location and at any of a plurality of subsequent marker locations to obtain an accurate eyewear location.

The virtual object rendering utility 920 prepares the virtual objects for display based on the eyewear location, the head pose of the wearer, and the location of one or more physical object landmarks in the physical environment, as described herein. The virtual object rendering utility 920, in some implementations, renders the virtual object automatically when the eyewear device 100 is located within a set proximity of a marker location.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of producing an augmented reality experience, comprising:
    registering, in a physical environment using a marker registration utility, a first set of data associated with a first marker, wherein said first set of data comprises a first marker location relative to one or more landmarks in said physical environment and relative to a marker coordinate system, a first perimeter, a first proximity, and at least one first virtual object,
    capturing an input image of said physical environment within a field of view of a camera coupled to an eyewear device, said eyewear device further comprising a processor, a memory, and a display;
    analyzing whether said input image includes said first marker;
    retrieving from said memory said first set of data;
    determining a first local position of said eyewear device relative to said first marker location;
    determining whether said first local position of said eyewear device is within said first proximity of said first perimeter;
    retrieving from said memory said at least one first virtual object comprising information associated with said first marker; and
    in response to determining that said first local position of said eyewear device is within said first proximity of said first perimeter, rendering said at least one first virtual object in said display relative to said first marker location and relative to said field of view.

2. The method of claim 1, wherein said camera comprises a pair of digital cameras spaced apart and configured to acquire a left-camera raw image and a right-camera raw image, and wherein said step of operating said camera further comprises:
generating said input image from said raw images, wherein said input image comprises a matrix of three-dimensional pixel locations.

3. The method of claim 1, further comprising:
registering, in said physical environment with said marker registration utility, a subsequent set of data associated with a subsequent marker, wherein said subsequent set of data comprises a subsequent marker location relative to one or more subsequent landmarks in said physical environment and relative to said marker coordinate system, a subsequent perimeter, a subsequent proximity, and at least one subsequent virtual object;
storing said subsequent set of data in said memory of said eyewear device;
determining by said processor a subsequent local position of said eyewear device relative to said subsequent marker location; and
determining by said processor a subsequent local position of said eyewear device relative to said subsequent perimeter.

4. The method of claim 3, further comprising:
registering a path relative to said marker coordinate system, said path including said first marker location, said subsequent marker location, and one or more intermediate locations therebetween; and
presenting on said display one or more directional indicators near said one or more intermediate locations for directing said user toward said subsequent marker location.

5. The method of claim 1, wherein said step of rendering said first virtual object further comprises:
determining by said processor a current distance between said first local position of said eyewear device and said first marker location;
determining by said processor a current relative orientation between said first local position of said eyewear device and said first marker location;
sizing said first virtual object according to said current distance; and
shaping said first virtual object according to said current relative orientation, such that said first virtual object appears persistently associated with said first marker location.

6. The method of claim 1, wherein said display is semi-transparent and facilitates a view of said physical environment, and wherein said step of rendering said first virtual object further comprises:
overlaying said first virtual object onto said view such that said first virtual object is persistently viewable along with said physical environment.

7. The method of claim 1, wherein said step of registering said first marker location in a physical environment further comprises: associating said first marker location with a first physical object location having coordinates relative to a geographical coordinate system, such that said first marker location is further associated with said geographical coordinate system.

8. The method of claim 1, further comprising:
presenting on said display a directional indicator comprising one or more instructions for guiding said user toward said first marker location.

9. The method of claim 1, wherein said first marker location comprises a first programmable duration, and wherein said step of rendering said first virtual object further comprises:
starting a first timer;
determining whether said first timer exceeds said first programmable duration;
in response to determining said first timer exceeds said first programmable duration, stopping said step of rendering.

10. A system for producing an augmented reality experience, comprising:
a marker registration utility configured to register, in a physical environment, a first set of data associated with a first marker, wherein said first set of data comprises a first marker location relative to one or more landmarks in said physical environment and relative to a marker coordinate system, a first perimeter, a first proximity, and at least one first virtual object;
an eyewear device comprising a camera, a processor, a memory, and a display;
programming in said memory, wherein execution of said programming by said processor configures said eyewear device to perform functions, including functions to:
capture an input image of said physical environment within a field of view of said camera;
analyze whether said input image includes said first marker;
retrieve from said memory said first set of data;
determine a first local position of said eyewear device relative to said first marker location using a localization utility;
determine whether said first local position of said eyewear device is within said first proximity of said first perimeter;
retrieve from said memory said at least one first virtual object comprising information associated with said first marker; and
in response to determining that said first local position of said eyewear device is within said first proximity of said first perimeter, render said at least one first virtual object in said display relative to said first marker location and relative to said field of view using a virtual object rendering utility.

11. The system of claim 10, wherein said programming in said memory of said eyewear device further includes said marker registration utility, and wherein execution of said marker registration utility further configures said eyewear device to:
register said first set of data; and
store said first set of data in said memory.

12. The system of claim 11, wherein said marker registration utility is further configured to:
register, in said physical environment, a subsequent set of data associated with a subsequent marker, wherein said subsequent set of data comprises a subsequent marker location relative to one or more subsequent landmarks in said physical environment and relative to said marker coordinate system, a subsequent perimeter, a subsequent proximity, and at least one subsequent virtual object; and store in said memory said subsequent set of data, and
wherein execution of said localization utility further configures said eyewear device to:
determine a subsequent local position of said eyewear device relative to said subsequent marker location; and
determine a subsequent local position of said eyewear device relative to said subsequent perimeter.

13. The system of claim 12, wherein execution of said marker registration utility further configures said eyewear device to:
register a path relative to said marker coordinate system, said path including said first marker location, said subsequent marker location, and one or more intermediate locations therebetween; and
present on said display one or more directional indicators near said one or more intermediate locations for directing said user toward said subsequent marker location.

14. The system of claim 10, wherein execution of said virtual object rendering utility further configures said eyewear device to:
determine a current distance between said first local position of said eyewear device and said first marker location;
determine a current relative orientation between said first local position of said eyewear device and said first marker location;
size said first virtual object according to said current distance; and
shape said first virtual object according to said current relative orientation, such that said first virtual object appears persistently associated with said first marker location.

15. The system of claim 10, wherein said display is semi-transparent and facilitates a view of said physical environment, and
wherein execution of said virtual object rendering utility further configures said eyewear device to overlay said first virtual object onto said view such that said first virtual object is persistently viewable along with said physical environment.

16. A non-transitory computer-readable medium storing program code which, when executed, is operative to cause an electronic processor to perform the steps of:
capturing an input image of a physical environment within a field of view of a camera coupled to an eyewear device, said eyewear device further comprising a processor, a memory, and a display;
analyzing whether said input image includes a first marker, wherein said first marker was registered, in said physical environment using a marker registration utility, wherein a first set of data associated with said first marker comprises a first marker location relative to one or more landmarks in said physical environment and relative to a marker coordinate system, a first perimeter, a first proximity, and at least one first virtual object;
retrieving from said memory said first set of data;
determining a first local position of said eyewear device relative to said first marker location;
rendering said first marker in said display relative to said first marker location and relative to said field of view;
determining whether said first local position of said eyewear device is within said first proximity of said first perimeter;
retrieving from said memory said at least one first virtual object comprising information associated with said first marker; and
in response to determining that said first local position of said eyewear device is within said first proximity of said first perimeter, rendering said at least one first virtual object in said display relative to said first marker location and relative to said field of view.

* * * * *